UNITED STATES PATENT OFFICE.

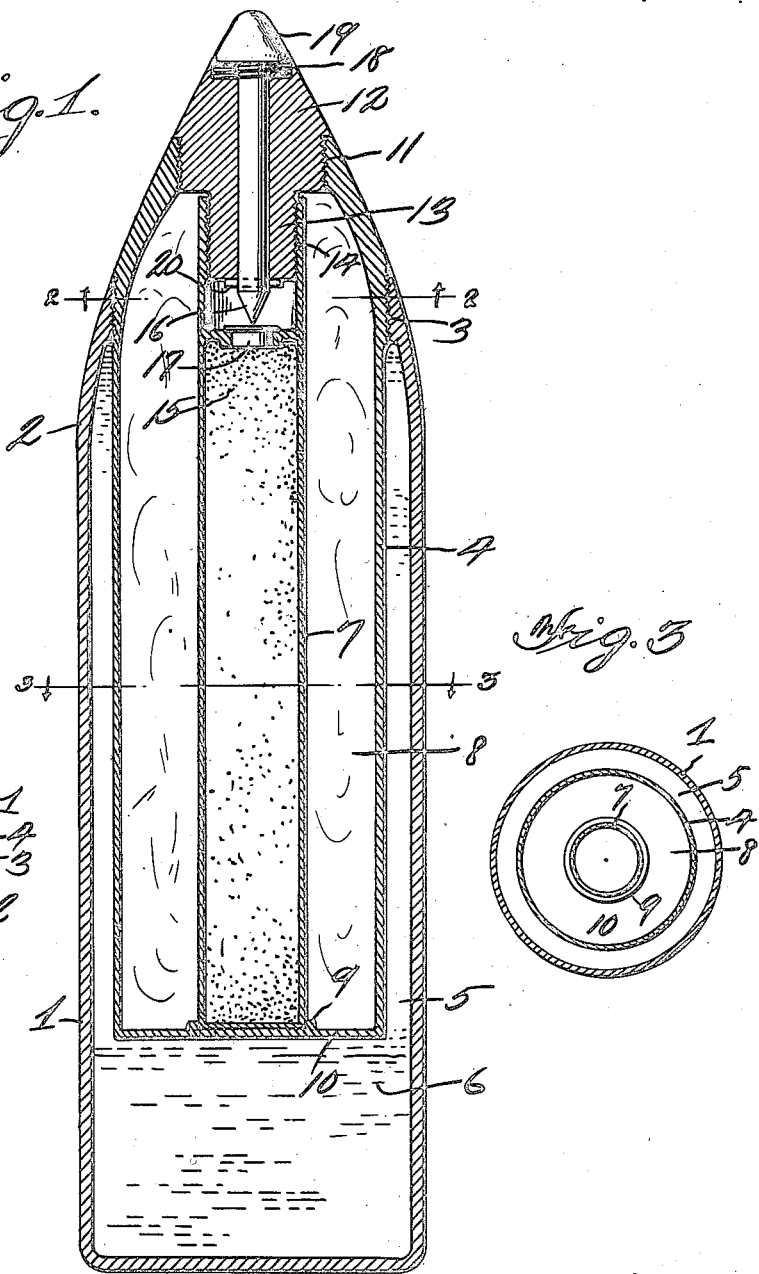

THEODORE L. WEEKE, OF OKAWVILLE, ILLINOIS.

SHELL.

1,417,475.  Specification of Letters Patent.  Patented May 23, 1922.

Application filed February 28, 1922. Serial No. 539,853.

*To all whom it may concern:*

Be it known that I, THEODORE L. WEEKE, a citizen of the United States, residing at Okawville, in the county of Washington, State of Illinois, have invented a new and useful Shell; and I do hereby declare the following to be a full, clear, and exact description of the invention, such as will enable others skilled in the art to which it appertains to make and use the same.

The invention relates to shells and has for its object to provide a device of this character wherein the shell is provided with chambers, one of said chambers being provided with a bursting charge ignited upon impact of the shell with an object. A poison gas receiving chamber around the bursting charge chamber and an ignitible liquid in the chamber around the poison gas chamber, thereby providing a shell combining the results now obtained by bursting shells, poison gas shells and inflammable shells.

A further object is to provide a shell comprising an outer casing, an intermediate casing threaded into the outer casing from its forward end, an inner casing axially disposed in the intermediate casing and held axially therein by an annular rib in the bottom of the intermediate casing and by the nose of the shell, which nose threads into the forward end of the intermediate casing and into the forward end of the inner casing. Also to provide the nose of the casing with a spring held firing pin, which firing pin upon impact of the shell cooperates with a firing cap for igniting a bursting charge in the inner casing.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 1 is a vertical sectional view through the shell.

Figure 2 is a horizontal sectional view through shell taken on line 2—2 of Figure 1.

Figure 3 is a sectional view through the shell taken on line 3—3 of Figure 1.

Referring to the drawing, the numeral 1 designates the main cylindrical casing of the shell, the end 2 of which tapers inwardly and is interiorly threaded at 3. Threaded into the threaded end 3 of the main casing 1 is an intermediate casing 4, which casing is axially disposed within the chamber 5 of the casing 1 and spaced from its inner wall, thereby forming a chamber extending around the intermediate casing and below the intermediate casing for reception of an inflammable liquid 6, such for instance as gasoline. Axially disposed within the intermediate casing 4 is an inner casing 7, which inner casing is spaced from the inner wall of the intermediate casing 4, thereby forming an annular chamber 8, which surrounds the inner casing 7 and is adapted to receive poison gas. The lower end of the inner casing 7 is held against displacement by means of the annular flange 9 carried by the inner side of the bottom 10 of the intermediate casing 4, which flange maintains the inner casing in axial position. The upper end of the intermediate casing 4 extends above the threaded portion 3 of the main casing 1, and is interiorly threaded at 11 for the reception of the removable nose 12 of the shell. The nose 12 of the shell is provided with an inwardly extending threaded reduced portion 13, which is threaded at 14 into the upper end of the inner casing 7, thereby additionally holding the inner casing 7. It will be seen that by removing the nose 12 that the various casings forming the shell may be easily and quickly disassembled or assembled. Disposed within the casing 7 is a shell bursting charge 15, which charge is ignited upon impact of the shell by the engagement of the firing pin 16 with the cap 17 against the expansive action of the spring 18, that is, when the end 19 of the firing pin 16 engages an object. The outward movement of the firing pin 6 is limited by the engagement of the pin 20 carried by the firing pin with the end of the extension 13 of the nose 12.

From the above it will be seen that a combined bursting, poison gas and inflammable shell is provided which is simple in construction and one wherein the parts may be easily and quickly assembled or disassembled.

The invention having been set forth what is claimed as new and useful is:—

1. A shell comprising a main casing, an auxiliary casing threaded in the forward end of the main casing and axially disposed within the chamber of the main casing in spaced relation with the inner wall thereof, the forward end of the auxiliary casing extending beyond the forward end of the main casing, an inner casing disposed within the auxiliary casing and adapted to receive a bursting charge, a detachable nose threaded into the forward end of the auxiliary casing and into the forward end of the inner casing, an exploding cap carried in the forward end of the inner casing and a firing pin longitudinally movable in the nose and in alignment with the firing cap, said firing pin being normally held out of engagement with the cap by a spring.

2. A shell comprising a main casing having its forward end provided with a threaded opening, an intermediate casing threaded into the threaded opening of the main casing and axially disposed within the chamber of the main casing, an inner casing axially disposed within the chamber of the intermediate casing, an annular flange carried by the inner side of the bottom of the intermediate casing and engaging the end of the inner casing, said intermediate casing being provided with a threaded opening, a removable nose threaded into the threaded opening of the intermediate casing and a threaded extension carried by said nose and threaded into the end of the inner casing, a firing pin carried by said nose and a firing cap carried by the inner casing in alignment with the firing pin.

In testimony whereof I have signed my name to this specification in the presence of two subscribing witnesses.

THEODORE L. WEEKE.

Witnesses:
 M. P. TALLIE,
 J. F. POENSING.